RESISTOR PASTE

Filed Jan. 28, 1971

INVENTORS
MITSUO WADA
MASANARI MIKODA
MASAKI AOKI
TADASHI HIKINO

BY Wenderoth, Lind & Ponack
ATTORNEYS

United States Patent Office 3,711,328
Patented Jan. 16, 1973

3,711,328

RESISTOR PASTE

Mitsuo Wada, Masanari Mikoda, Masaki Aoki, and Tadashi Hikino, Osaka, Japan, assignors to Matsushita Electric Industrial Co., Ltd., Osaka, Japan Filed Jan. 28, 1971, Ser. No. 110,681
Int. Cl. H01b *3/08, 3/12, 1/06*
U.S. Cl. 252—518 8 Claims

ABSTRACT OF THE DISCLOSURE

Novel resistor pastes are provided, which, on firing, form resistors with low differential in electrical resistance between the glass coated and uncoated form. The resistor pastes comprise, as a solid ingredient, 40 to 90% by weight of a mixture consisting essentially of 20 to 92% by weight of finely divided cadmium oxide and 8 to 80% by weight of finely divided glass frit and 10 to 60% by weight of liquid vehicle, said finely divided glass frit consisting essentially of 0.1 to 17.0% by weight of $Ag_2O$ and 83.0 to 99.9% by weight of a base composition which consists essentially of 60 to 80% by weight of PbO, 8 to 16% by weight of $B_2O_3$ and 12 to 24% by weight of ZnO.

This invention relates to a vitreous enamel resistor paste which may be applied to and fired on ceramic insulating materials to produce electrical glaze resistors.

Many attempts have been made heretofore to produce glaze resistors by applying a resistor paste onto a ceramic insulator and firing the same to fuse and mature the resistor composition. For example, U.S. Patents Nos. 2,924,540 and 3,052,573 disclose a good enamel resistor paste comprising finely divided noble metal such as gold, platinum, palladium, silver and finely divided glass frit. However, such enamel resistor paste is expensive though it is superior in the resultant characteristics of resistors prepared therefrom. Cadmium oxide has been used as a useful conductive material for glaze resistors. The detailed information on the glaze resistors was described in the U.S. Pat. No. 3,551,194.

Usually, glaze resistors are prepared by applying resistor paste to an insulating ceramic base having silver electrodes formed thereon. The applied resistor paste is then fired at a suitable temperature to produce a resistor film adhered firmly to the insulating ceramic base. The formed resistor film is generally coated with an overcoating glass to ensure a long life. The overcoat glass is prepared by applying overcoat glass paste to the resistor film. The overcoat glass paste usually includes a glass frit powder dispersed in a liquid vehicle. Their firing temperature is lower than the temperature of the resistor paste. In the overcoating process, the problem is that the electrical resistance of coated resistor film differs from that of the original resitsor film having no overcoating. Such a difference makes it difficult to uniformly mass produce the glaze resistor. The reason for this difference is very complicated and is not known with certainty. However, its main reason may be attributed to a migration of silver ions from the silver electrodes.

Therefore, a principal object of this invention is to provide a cadmium oxide resistor paste characterized by a small difference in the electrical resistance before and after overcoating.

A further object of this invention is to provide a cadmium oxide resistor paste characterized by a small temperature coefficient of electrical resistance.

Another object of this invention is to provide a cadmium oxide resistor paste which makes it possible to produce a glaze resistor in a wide range of electrical resistance.

These and other objects of this invention will be apparent upon consideration of the following detailed description taken together with accompanying drawings wherein.

Figure 1:
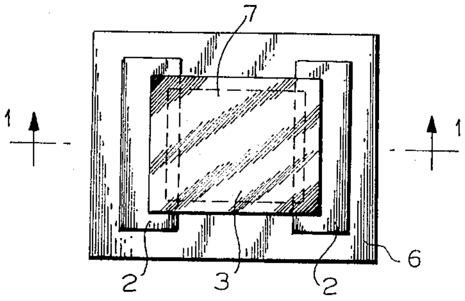
FIG. 1 is a top view of the glaze resistor using a resistor paste according to the present invention.
Figure 2:
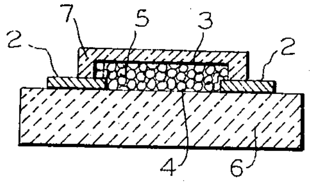
FIG. 2 is an enlarged cross-sectional view of the glaze resistor, cut along a line 1–1′ of FIG. 1.

Referring to FIGS. 1 and 2, reference numeral 3 designates a resistor film consisting essentially of finely divided cadmium oxide powder 4 and a glass frit 5 bonding said cadmium oxide powder together. A ceramic insulating base 6 has said resistor film 3 adhered firmly thereon. Said glass frit 5 also acts as an adhesive to adhere said resistor film 3 firmly to said insulating base 6 and is prepared by fusing glass frit included in the resistor paste described hereinafter. Said insulating base 6 has been provided with a pair of electrodes 2 in advance of application of said resistor paste. Finally, said resistor film 3 is coated with a coating glass 7. Said resistor paste can be applied by a suitable and available method, such as screen printing or brushing of an insulating base 6 having a pair of silver electrodes 2 applied thereto. The applied resistor paste is heated in air to produce said resistor film 3 which adheres firmly to said insulating base 6.

Said resistor film 3 is coated with an overcoating glass 7 commercially available, which has a lower softening temperature. Usually said overcoating glass can be applied by using an overcoating glass paste which has a finely divided glass frit in a liquid vehicle and is fired at a temperature lower than the temperature at which the said resistor paste has been fired previously.

It has been discovered, according to the present invention, that a resistor paste according to the present invention forms a glaze resistor characterized by a small change in the electrical resistance before and after overcoating. A resistor paste according to the present invention comprises, as a solid ingredient, 40 to 90% by weight of a mixture consisting essentially of 20 to 92% by weight of finely divided cadmium oxide (CdO) and 8 to 80% by weight of finely divided glass frit and 10 to 60% by weight of liquid vehicle, said finely divided glass frit consisting essentially of 0.1 to 17.0% by weight of silver oxide ($Ag_2O$) and 83.0 to 99.9% by weight of a base composition. Said base composition consists essentially of 60 to 80% by weight of lead oxide (PbO), 8 to 16% by weight of boron oxide ($B_2O_3$) and 12 to 24% by weight of zinc oxide (ZnO).

An advantageous glass frit for improvement of electrical resistance change due to overcoating consists essentially of 0.1 to 3.0% by weight of $Ag_2O$ and 97.0 to 99.9% by weight of said base composition. Use of silver oxide at less than 0.1% by weight does not show any perceptible improvement in the electrical resistance change.

A glaze resistor using a glass frit consisting essentially of 3.0 to 17.0% by weight of silver oxide and 83.0 to 97.0% by weight of aforesaid base composition shows a particularly low temperature coefficient of electrical resistance in addition to a relatively low electrical resistance change due to the overcoating.

Use of silver oxide at more than 17% by weight causes the glass frit to divitrify and impairs bonding effect.

A glaze resistor having a relatively high electrical resistance and a small electrical resistance change due to the overcoating is obtained by using a glass frit consisting essentially of 0.1 to 3.0% by weight of silver oxide, 3 to 8% by weight of aluminum oxide ($Al_2O_3$) and 89 to 96.9% by weight of aforesaid base composition.

In the above description, said resistor paste is always in a composition 40 to 90% by weight of a mixture consisting essentially of 20 to 82% by weight of finely divided cadmium oxide and 8 to 80% by weight of glass frit and 10 to 60% by weight of liquid vehicle.

Said resistor paste, according to this invention, can be prepared by dispersing homogeneously a uniform mixture of glass frit powder and a cadmium oxide powder in a liquid vehicle.

The liquid vehicle may vary widely in composition. Any liquid vehicle can be employed for this purpose, for example, water, organic solvent, with or without thickening agent, stabilizing agent or the like, for example, methyl, ethyl, butyl, propyl or higher alcohol, the corresponding ester such as carbitol acetate, propionates, etc., terpene and liquid resins, for example, pine oil, alpha-terpineol oil and the like, and the other liquids without limitation, the function of the liquid vehicle being mainly to form a liquid or paste of the dispersed consistency for application purposes.

The liquid vehicle may contain or be composed of a volatile vehicle to promote fast setting after application, or they may contain waxes, thermoplastic resins such as ethyl cellulose or waxlike material which are thermofluid by nature whereby the composition can be applied to a thermoinsulator or at an elevated temperature to set immediately upon contact with an insulating base.

It is important to control the particle size of a cadmium oxide powder and glass frit to be incorporated with said vehicle. Advantageous average particle size of cadmium oxide powder is 0.05 to 20 microns and advantageous particle size of glass frit is 0.5 to 30 microns.

The resistor paste is applied in a uniform thickness to the insulating base. This may be done by any application method, such as stencil, spray, print, dip or brush method. It is preferable that the viscosity of the resultant paste be 500 to 2000 poises for the stencil method.

The resistor paste applied to the ceramic base is dried, if necessary, to remove solvent from the liquid vehicle and is then fired in an electrical furnace at a temperature at which the glass frit fuses so as to bond the cadmium oxide powder particles and to adhere firmly to the insulating base.

The following examples are given to illustrate certain preferred details of the invention, it being understood that the details of the examples are not to be taken as in any way limiting the invention thereto.

EXAMPLE 1

Various glass frits in a composition shown in Table 1 are prepared in accordance with per se well known glass frit techniques. The glass frits are pulverized by a wet ball mill to an average particle size of 1.5 microns. The average particle size of cadmium oxide powder used is 0.8 micron. Although it is desirable to maintain the particle size fairly consistent to obtain good reproducible results, the actual particle sizes are not critical.

A mixture of 2.8 grams of cadmium oxide powder and 1.2 grams of each of the glass frit powders are mixed well with 1.2 grams of liquid vehicle including 10% by weight of ethyl cellulose in butyl carbitol acetate by using an automatic muller mixing machine to produce a resistor paste. The resistor paste is applied, by using a stencil screen printing method, to forsterite insulating bases, each having a pair of silver electrodes spaced by 0.5 mm., 1.0 mm., 1.5 mm., 2.0 mm. or 3.0 mm. from each other. The width of the applied resistor paste is 0.5 mm., 1.0 mm., 1.5 mm., 2.0 mm. or 3.0 mm. Accordingly, the applied resistor paste has a resistor active area of 0.5 mm. x 0.5 mm., 1.0 mm. x 1.0 mm., 1.5 x 1.5 mm., 2.0 mm. x 2.0 mm. and 3.0 mm. x 3.0 mm. The electrical resistance on these square areas will be defined as a surface resistivity (kΩ./sq.).

The resistor paste on the forsterite base is heated in a tunnel type furnace which has a temperature schedule that a sample can be heated at 760° C. for 6 minutes. The fired resistor film has a surface resistivity shown in Table 1 and has a thickness of approximately 18 microns.

The overcoat glass paste is prepared by mixing 30% by weight of liquid vehicle similar to that mentioned above and 70% by weight of glass frit powder consisting of 75% by weight of lead oxide, 11.2% by weight of boron oxide, 10.5% by weight of aluminum oxide and 3.3% by weight of silica.

So produced overcoating glass paste is applied to the resistor film by a stencil screen printing method, dried at 120° C. for 10 minutes and then fired at 450° C. for 3 minutes by a tunnel type furnace. The difference in the electrical resistance before and after overcoating is shown in samples Nos. 1 to 4 of Table 1 in connection with a glaze resistor having silver oxide incorporated with the glass frit which resistor has a lower electrical resistance change than that of the glaze resistor using glass frit without silver oxide.

EXAMPLE 2

The resistor paste is prepared by using a glass frit powder in a compostion shown in Table 1 exactly as in Example 1. The resistor paste is applied by a screen printing method to a forsterite insulating base having a pair of electrodes spaced by 1 mm. from each other. The applied resistor paste has a width of 1 mm. The applied resistor paste is dried and fired in a manner exactly similar to that of Example 1.

The fired resistor film is in a thickness about 18 micron and has a surface resistivity and temperature coefficient of resistance (T.C.R., p.p.m./° C.) shown in Table 1. In view of these data, it is clear that a use of a glass frit, including a silver oxide, makes it possible to change the temperature coefficient over a wide range from a negative value to positive value and extends the operable surface resistivity. For example, a use of 17% by weight of silver oxide (Sample No. 8) produces the surface resistivity lower by one order than that without the use of silver oxide (Sample No. 1).

EXAMPLE 3

A mixture of 2.8 grams of cadmium oxide powder and 1.2 grams of glass frit powder, shown in Table 2, is mixed well with 1.2 grams of liquid vehicle similar to that of Example 1. The resistor film is prepared by using the resistor paste of Example 1 and has a thickness of about 18 microns. Table 2 indicates a surface resistivity of these resistor films. The resistor film is coated with overcoat glass in a manner exactly similar to that of Example 1.

The difference in the electrical resistance between, before and after overcoating is shown in Samples No. 9 to 12 of Table 2 with respect to the resistor area. From this data it is clear that the change in the electrical resistance due to overcoating is greatly improved by using glass frit including silver oxide.

TABLE 1

| | Glass composition, wt. percent | | | | Surface resistivity, | Resistance change, percent | | | | | T.C.R., |
|---|---|---|---|---|---|---|---|---|---|---|---|
| Sample No. | PbO | $B_2O_3$ | ZnO | $Ag_2O$ | Kω/sq. | 0.25 mm.[2] | 1.0 mm.[2] | 2.25 mm.[2] | 4.0 mm.[2] | 9.0 mm.[2] | p.p.m. ° C. |
| 1 | 74.7 | 11.6 | 13.7 | 0 | 0.23 | −5.3 | +9.2 | +14.5 | +18 | +22 | −200 |
| 2 | 74.6 | 11.6 | 13.7 | 0.1 | 0.23 | −1.0 | +1.8 | +2.2 | +2.2 | +2.2 | −200 |
| 3 | 73.7 | 11.6 | 13.7 | 1.0 | 0.22 | +1.0 | +1.0 | +1.0 | +1.2 | +1.2 | −200 |
| 4 | 71.7 | 11.6 | 13.7 | 3.0 | 0.20 | +2.1 | −1.8 | −1.8 | −1.5 | −1.5 | −190 |
| 5 | 70.7 | 11.6 | 13.7 | 4.0 | 0.115 | ---- | −2.0 | ---- | ---- | ---- | −140 |
| 6 | 69.7 | 11.6 | 13.7 | 5.0 | 0.053 | ---- | −2.0 | ---- | ---- | ---- | −40 |
| 7 | 64.7 | 11.6 | 13.7 | 10 | 0.029 | ---- | −2.0 | ---- | ---- | ---- | +60 |
| 8 | 57.7 | 11.6 | 13.7 | 17 | 0.019 | ---- | −2.0 | ---- | ---- | ---- | +180 |

TABLE 2

| Sample No. | Glass composition, wt. percent | | | | | Surface resis- tivity, | Resistance change, percent | | | | |
|---|---|---|---|---|---|---|---|---|---|---|---|
| | PbO | $B_2O_3$ | ZnO | $Al_2O_3$ | $Ag_2O$ | Aω/sq. | 0.25 mm.$^2$ | 1.0 mm.$^2$ | 2.25 mm.$^2$ | 4.0 mm.$^2$ | 9.0 mm.$^2$ |
| 9 | 67.7 | 11.6 | 13.7 | 7.0 | 0 | 2.35 | −1.5 | +4.0 | +6.1 | +7.5 | +9.0 |
| 10 | 67.6 | 11.6 | 13.7 | 7.0 | 0.1 | 2.35 | +0.5 | −1.3 | −1.4 | −1.4 | −1.5 |
| 11 | 66.7 | 11.6 | 13.7 | 7.0 | 1.0 | 2.30 | −0.4 | −0.5 | −0.6 | −0.6 | +0.8 |
| 12 | 64.7 | 11.6 | 13.7 | 7.0 | 3.0 | 1.90 | +1.2 | +1.0 | +0.8 | +0.8 | +0.8 |

The embodiments of the invention in which exclusive property or privilege is claimed are defined as follows:

1. A resistor paste comprising, as a solid ingredient, 40 to 90% by weight of a mixture consisting essentially of 20 to 92% by weight of finely divided cadmium oxide and 8 to 80% by weight of finely divided glass frit and 10 to 60% by weight of liquid vehicle, said finely divided glass frit consisting essentially of 0.1 to 17.0% by weight of $Ag_2O$ and 83.0 to 99.9% by weight of a base composition which consists essentially of 60 to 80% by weight of PbO, 8 to 16% by weight of $B_2O_3$ and 12 to 24% by weight of ZnO.

2. A resistor paste defined by claim 1, wherein said finely divided glass frit consists essentially of 0.1 to 3.0% by weight of $Ag_2O$ and 97.0 to 99.9% by weight of said base composition.

3. A resistor paste defined by claim 1, wherein said finely divided glass frit consists essentially of 3.0 to 17.0% by weight of $Ag_2O$ and 83.0 to 97.0% by weight of said base composition.

4. A resistor paste defined by claim 1, wherein said finely divided glass frit consists essentially of 0.1 to 3% by weight of $Ag_2O$, 3 to 8% by weight of $Al_2O_3$ and 89 to 96.9% by weight of said base composition.

5. A resistor comprising the fixed resistor paste of claim 1 on a ceramic insulating base.

6. A resistor comprising the fixed resistor paste of claim 2 on a ceramic insulating base.

7. A resistor comprising the fixed resistor paste of claim 3 on a ceramic insulating base.

8. A resistor comprising the fixed resistor paste of claim 4 on a ceramic insulating base.

References Cited

UNITED STATES PATENTS

| | | | |
|---|---|---|---|
| 3,551,195 | 12/1970 | Wada et al. | 252—578 |
| 3,484,284 | 12/1969 | Dates et al. | 252—518 |
| 3,441,516 | 4/1969 | Mulligan et al. | 252—518 |
| 3,401,126 | 9/1968 | Miller et al. | 252—518 |
| 3,238,151 | 3/1966 | Kim | 252—518 |
| 3,121,065 | 2/1964 | Greger et al. | 252—518 |
| 3,052,573 | 9/1962 | Dumesnil | 252—518 |
| 2,751,477 | 6/1956 | Fitzgerald | 252—518 |
| 2,720,471 | 10/1955 | Suchet et al. | 252—518 |
| 2,588,926 | 3/1952 | Green | 252—518 |
| 2,425,032 | 8/1947 | Deyrup | 252—578 |

GEORGE F. LESMES, Primary Examiner

J. P. BRAMMER, Assistant Examiner

U.S. Cl. X.R.

117—201